US012269938B2

(12) United States Patent
Weyland et al.

(10) Patent No.: US 12,269,938 B2
(45) Date of Patent: Apr. 8, 2025

(54) POLYETHYLENE OR POLYPROPYLENE ARTICLES

(71) Applicant: BASF SE, Ludwigshafen am Rhein (DE)

(72) Inventors: Tania Weyland, Kaisten (CH); Heinz Herbst, Kaisten (CH); Marie Laure Bertet, Levallois-Perret (FR)

(73) Assignee: BASF SE, Ludwigshafen Am Rhein (DE)

( * ) Notice: Subject to any disclaimer, the term of this patent is extended or adjusted under 35 U.S.C. 154(b) by 716 days.

(21) Appl. No.: 17/299,216

(22) PCT Filed: Nov. 22, 2019

(86) PCT No.: PCT/EP2019/082327
§ 371 (c)(1),
(2) Date: Jun. 2, 2021

(87) PCT Pub. No.: WO2020/114810
PCT Pub. Date: Jun. 11, 2020

(65) Prior Publication Data
US 2022/0041846 A1 Feb. 10, 2022

(30) Foreign Application Priority Data

Dec. 4, 2018 (EP) .................................. 18210178
Jan. 29, 2019 (EP) .................................. 19154158

(51) Int. Cl.
| | | |
|---|---|---|
| C08L 23/06 | (2006.01) |
| C08K 3/22 | (2006.01) |
| C08K 3/26 | (2006.01) |
| C08K 5/3492 | (2006.01) |
| F16L 9/12 | (2006.01) |

(52) U.S. Cl.
CPC ............... *C08L 23/06* (2013.01); *C08K 3/22* (2013.01); *C08K 3/26* (2013.01); *C08K 5/3492* (2013.01); *F16L 9/12* (2013.01); *C08K 2003/2224* (2013.01); *C08K 2003/267* (2013.01); *C08K 2201/005* (2013.01); *C08L 2201/08* (2013.01); *C08L 2203/18* (2013.01)

(58) Field of Classification Search
CPC . C08L 23/06; C08L 23/12; C08K 2003/2224; C08K 5/34926; C08K 5/3492
See application file for complete search history.

(56) References Cited

U.S. PATENT DOCUMENTS

| | | | |
|---|---|---|---|
| 4,325,863 A | 4/1982 | Hinsken et al. | |
| 4,338,244 A | 7/1982 | Hinsken et al. | |
| 4,615,831 A * | 10/1986 | Kanno | C08K 3/22 |
| | | | 106/18.32 |
| 5,134,181 A * | 7/1992 | Masina | C08K 3/22 |
| | | | 524/282 |
| 5,175,312 A | 12/1992 | Dubs et al. | |
| 5,180,762 A | 1/1993 | Canova | |
| 5,216,052 A | 6/1993 | Nesvadba | |
| 5,252,643 A | 10/1993 | Nesvadba | |
| 5,262,233 A * | 11/1993 | Sudo | C08L 23/0892 |
| | | | 47/29.1 |
| 5,461,101 A * | 10/1995 | Rothon | C08K 3/22 |
| | | | 524/436 |
| 6,046,304 A | 4/2000 | Borzatta et al. | |
| 6,444,733 B1 | 9/2002 | Stadler | |
| 6,787,591 B2 | 9/2004 | Koch et al. | |
| 2006/0148940 A1* | 7/2006 | Sun | C08K 5/0058 |
| | | | 524/99 |
| 2008/0242775 A1* | 10/2008 | Soma | C08K 5/3435 |
| | | | 524/130 |
| 2016/0244591 A1 | 8/2016 | Andrews et al. | |

FOREIGN PATENT DOCUMENTS

| | | |
|---|---|---|
| CN | 106397913 A | 2/2017 |
| CN | 103387709 B | 8/2017 |
| DE | 4316611 A1 | 11/1993 |
| DE | 4316622 A1 | 11/1993 |
| DE | 4316876 A1 | 11/1993 |
| EP | 0589839 A1 | 3/1994 |
| EP | 0591102 A1 | 4/1994 |
| EP | 0911362 A1 | 4/1999 |
| EP | 1291384 A1 | 3/2003 |
| RU | 2242364 C2 | 12/2004 |
| RU | 2251562 C2 | 5/2005 |
| RU | 2263688 C2 | 11/2005 |
| WO | 0042109 A2 | 7/2000 |

(Continued)

OTHER PUBLICATIONS

European Search Report for EP Patent Application No. 19154158.0, Issued on Jul. 9, 2019, 3 pages.
European Search Report for EP Patent Application No. 18210178.2, Issued on May 20, 2019, 3 pages.
Liu, et al., "Tracking-resistant cable material and preparation method thereof", Database CA [Online], Chemical Abstracts Service, retrieved from STN Database accession No. 2017:253793, XP002791037, Feb. 15, 2017, 1 page.
International Search Report issued in PCT/EP2019/082327, dated Jan. 23, 2020, pp. 1-3.

*Primary Examiner* — Robert C Boyle
(74) *Attorney, Agent, or Firm* — ArentFox Schiff LLP

(57) ABSTRACT

An article in the form of a pipe, cable or geomembrane comprising polyethylene or polypropylene, and components A) and B), wherein component A) is a hindered amine light stabilizer containing a triazine residue, component B) is magnesium hydroxide which is present in an amount of 0.01% to 5% by weight relative to the weight of the polyethylene or polypropylene, and the weight ratio of component A) to component B) is 1:50 to 50:1, with the proviso that component B) is not a hydrotalcite.

7 Claims, No Drawings

(56) References Cited

FOREIGN PATENT DOCUMENTS

WO         0162836 A1   8/2001
WO   02/081574 A1   10/2002

* cited by examiner

POLYETHYLENE OR POLYPROPYLENE ARTICLES

CROSS-REFERENCE TO RELATED APPLICATIONS

This application is a National Stage Entry of PCT/EP2019/082327, filed Nov. 22, 2019, which claims priority to EP application Nos. 18210178.2, filed Dec. 4, 2018, and 19154158.0, filed Jan. 29, 2019, the disclosures of each of which are hereby incorporated by reference in their entireties.

The present invention relates to an article in the form of a pipe, cable or geomembrane comprising polyethylene or polypropylene, and components A) and B), wherein component A) is a hindered amine light stabilizer containing a triazine residue, component B) is magnesium hydroxide which is present in an amount of 0.01% to 5% by weight relative to the weight of the polyethylene or polypropylene, and the weight ratio of component A) to component B) is 1:50 to 50:1, with the proviso that component B) is not a hydrotalcite.

Component A) is in particular at least one compound of the formula (A-I), (A-II) or (A-III)

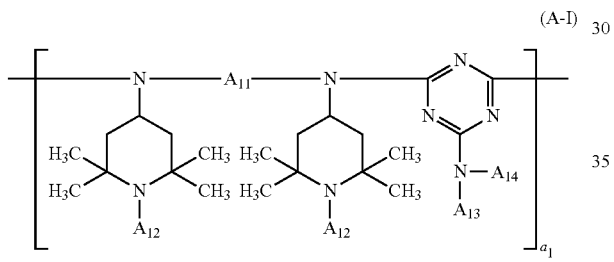

(A-I)

wherein $A_{11}$ is $C_2$-$C_{18}$alkylene, $C_5$-$C_7$cycloalkylene or $C_1$-$C_4$alkylenedi-($C_5$-$C_7$cycloalkylene), the radicals $A_{12}$ independently of one another are hydrogen, $C_1$-$C_{12}$alkyl or $C_5$-$C_{12}$cycloalkyl, $A_{13}$ and $A_{14}$ independently of one another are hydrogen, $C_1$-$C_{12}$alkyl, $C_5$-$C_{12}$cycloalkyl or a group of the formula (a-1),

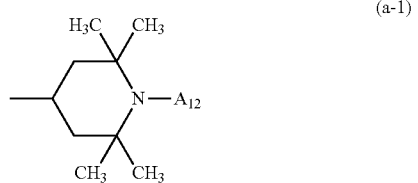

(a-1)

or the radicals $A_{13}$ and $A_{14}$, together with the nitrogen atom to which they are bonded, form a 5- to 10-membered heterocyclic ring and $a_1$ is a number from 1 to 20, preferably 2 to 20, and the repeating units are identical or different;

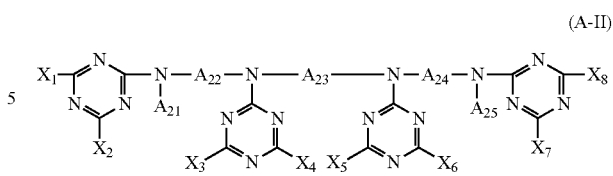

(A-II)

wherein $A_{21}$ and $A_{25}$ independently of one another are hydrogen, $C_1$-$C_{12}$alkyl, $C_5$-$C_{12}$cycloalkyl or a group of the formula (a-1), $A_{22}$, $A_{23}$ and $A_{24}$ independently of one another are $C_2$-$C_{10}$alkylene, and $X_1$, $X_2$, $X_3$, $X_4$, $X_5$, $X_6$, $X_7$ and $X_8$ independently of one another are a group of the formula (a-2),

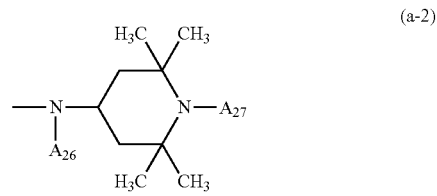

(a-2)

in which $A_{26}$ is hydrogen, $C_1$-$C_{12}$alkyl, $C_5$-$C_{12}$cycloalkyl or a group of the formula (a-1) as defined above, and $A_{27}$ has one of the meanings of $A_{12}$;

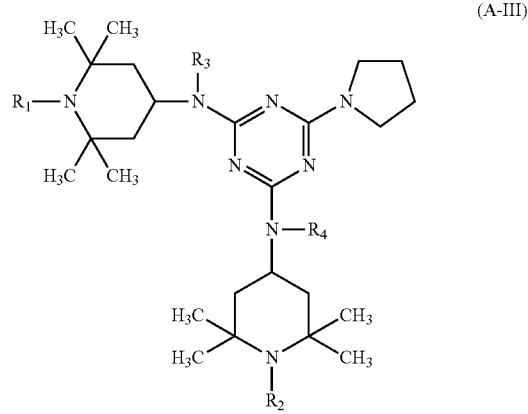

(A-III)

wherein $R_1$ and $R_2$ independently of one another are hydrogen, $C_1$-$C_{22}$alkyl, —O⁻, —OH, —CH$_2$CN, $C_1$-$C_{18}$alkoxy, $C_2$-$C_{18}$alkoxy substituted by —OH; $C_5$-$C_{12}$cycloalkoxy, $C_3$-$C_6$alkenyl, $C_3$-$C_6$alkenyloxy, $C_7$-$C_9$phenylalkyl unsubstituted or substituted on the phenyl by 1, 2 or 3 $C_1$-$C_4$alkyl; or $C_1$-$C_8$acyl; and $R_3$ and $R_4$ independently of one another are $C_1$-$C_{22}$alkyl or a group of the formula (a-3)

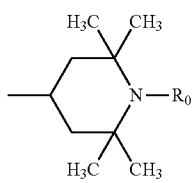

(a-3)

wherein $R_0$ has one of the meanings of $R_1$ and $R_2$.

Examples of alkyl having up to 22 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl and eicosyl. $C_1$-$C_{18}$alkoxy is for example methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy or octadecyloxy.

$C_2$-$C_{18}$alkoxy substituted by —OH is for example 2-hydroxyethoxy.

$C_5$-$C_{12}$cycloalkyl is for example cyclopentyl, cyclohexyl, cycloheptyl, cyclooctyl, cyclodecyl or cyclododecyl. $C_5$-$C_8$Cycloalkyl, in particular cyclohexyl, is preferred. $C_5$-$C_{12}$cycloalkoxy is for example cyclopentoxy, cyclohexoxy, cycloheptoxy, cyclooctoxy, cyclodecyloxy or cyclododecyloxy. $C_5$-$C_8$Cycloalkoxy, in particular cyclopentoxy and cyclohexoxy, is preferred.

$C_3$-$C_6$alkenyl is for example allyl, 2-methallyl, butenyl, pentenyl or hexenyl. Allyl is preferred. The carbon atom in position 1 is preferably saturated.

$C_3$-$C_6$alkenyloxy is for example propenyloxy.

$C_7$-$C_9$phenylalkyl unsubstituted or substituted on the phenyl by 1, 2 or 3 $C_1$-$C_4$alkyl is for example benzyl, 2-phenylethyl, methylbenzyl, dimethylbenzyl, trimethylbenzyl or tert-butylbenzyl.

Examples of $C_1$-$C_8$acyl are formyl, acetyl, propionyl, butyryl, pentanoyl, hexanoyl, heptanoyl, octanoyl, acryloyl, methacryloyl and benzoyl. $C_1$-$C_8$Alkanoyl, $C_3$-$C_8$alkenoyl and benzoyl are preferred. Acetyl and acryloyl are especially preferred.

Examples of alkylene having up to 18 carbon atoms are ethylene, propylene, trimethylene, tetramethylene, pentamethylene, 2,2-dimethyltrimethylene, hexamethylene, trimethylhexamethylene and octamethylene. $C_2$-$C_6$alkylene, in particular hexamethylene is preferred.

An example of $C_5$-$C_7$cycloalkylene is cyclohexylene.

An example of $C_1$-$C_4$alkylenedi($C_5$-$C_7$cycloalkylene) is methylenedicyclohexylene.

A preferred example of a 5- to 7-membered heterocyclic ring is a morpholine group.

The meanings of the terminal groups which saturate the free valences in the compounds of the formula (A-I) depend on the processes used for their preparation. The terminal groups can also be modified after the preparation of the compounds.

If the compounds of the formula (A-I) are prepared by reacting a compound of the formula

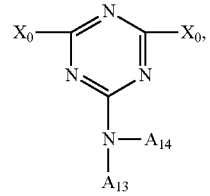

in which $X_0$ is, for example, halogen, in particular chlorine, and $A_{13}$ and $A_{14}$ are as defined above, with a compound of the formula

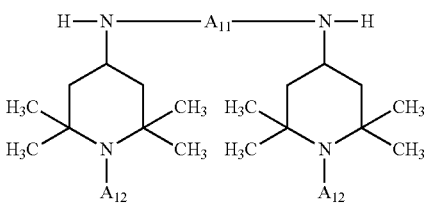

in which $A_{11}$ and $A_{12}$ are as defined above, the terminal group bonded to the diamino radical is for example hydrogen or

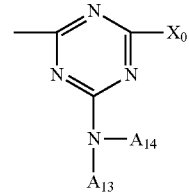

and the terminal group bonded to the triazine radical is for example $X_0$ or

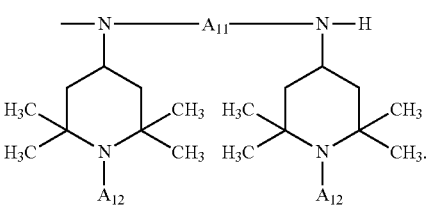

If $X_0$ is halogen, it is advantageous to replace this, for example, by —OH or an amino group when the reaction is complete. Examples of amino groups which may be mentioned are pyrrolidin-1-yl, morpholino, —$NH_2$, —$N(C_1$-$C_8$alkyl)$_2$ and —$NR_0(C_1$-$C_8$alkyl), in which $R_0$ is hydrogen or a group of the formula (Ia).

One of the preferred compounds of the formula (A-I) is

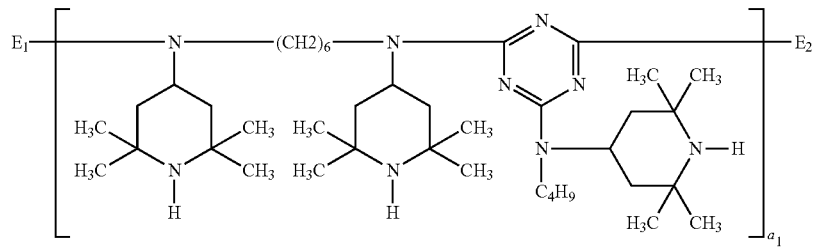

wherein $E_1$ is

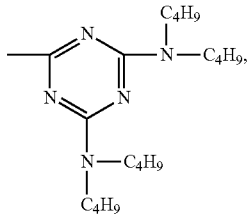

$E_2$ is

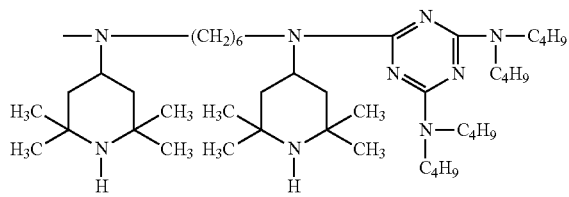

and $a_1$ is a number from 1 to 10, preferably 2 to 10. The preparation of this compound is described in Example 10 of U.S. Pat. No. 6,046,304.

According to a preferred embodiment
$A_{11}$ is $C_2$-$C_{10}$alkylene,
the radical $A_{12}$ is hydrogen, $C_1$-$C_4$alkyl or cyclohexyl,
$A_{13}$ and $A_{14}$ independently of one another are hydrogen, $C_1$-$C_4$alkyl, cyclohexyl or a group of the formula (a-1),

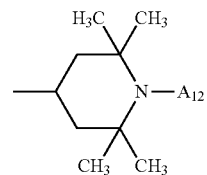

or the radicals $A_{13}$ and $A_{14}$, together with the nitrogen atom to which they are bonded, form a morpholino group and
$a_1$ is a number from 1 to 10, preferably 2 to 10, and the repeating units are identical or different;
$A_{21}$ and $A_{25}$ independently of one another are hydrogen, $C_1$-$C_4$alkyl or cyclohexyl,
$A_{22}$, $A_{23}$ and $A_{24}$ independently of one another are $C_2$-$C_{10}$alkylene, and
$X_1$, $X_2$, $X_3$, $X_4$, $X_5$, $X_6$, $X_7$ and $X_8$ independently of one another are a group of the formula (a-2),

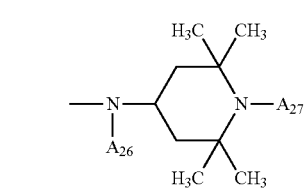

in which $A_{26}$ is hydrogen, $C_1$-$C_4$alkyl, cyclohexyl or a group of the formula (a-1) as defined above, and $A_{27}$ has one of the meanings of $A_{12}$;
$R_1$ and $R_2$ independently of one another are hydrogen, $C_1$-$C_4$alkyl or cyclohexyl; and
$R_3$ and $R_4$ are $C_1$-$C_{22}$alkyl.

According to a further preferred embodiment component A) is a compound of the formula (A-I-1), (A-I-2), (A-II-1) or (A-III-1),

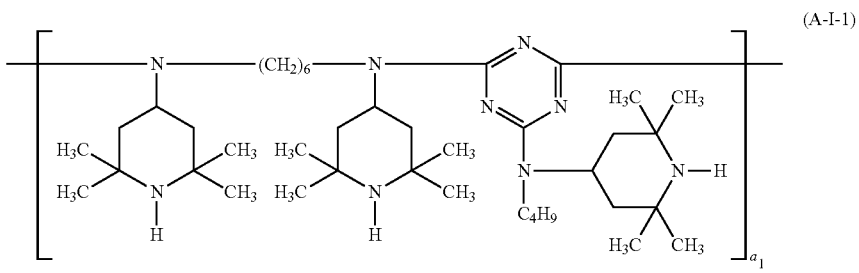

with $a_1$ being 2 to 10,

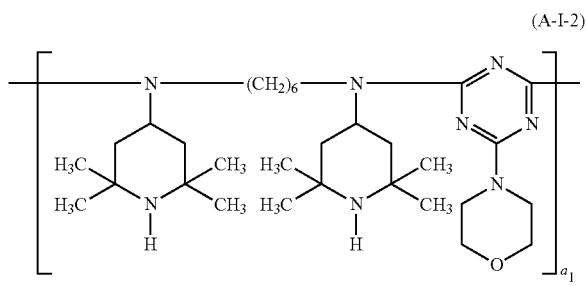

(A-I-2)

with $a_1$ being 2 to 10,

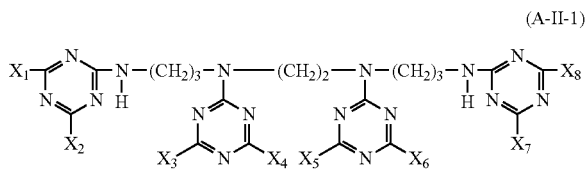

(A-II-1)

wherein $X_1$, $X_2$, $X_3$, $X_4$, $X_5$, $X_6$, $X_7$ and $X_8$ are the group

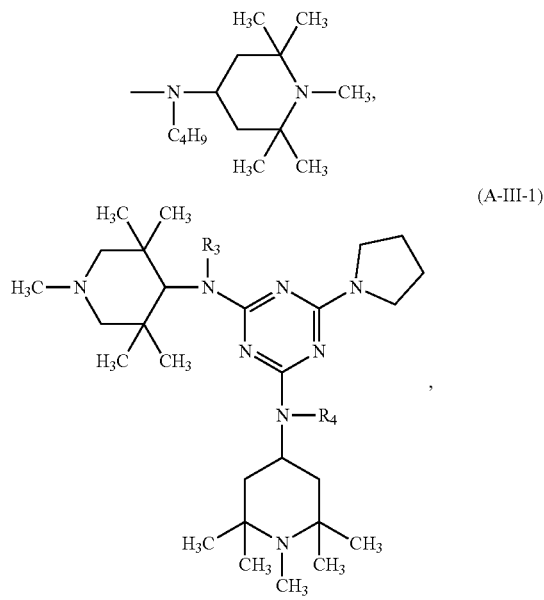

(A-III-1)

wherein $R_3$ and $R_4$ are $C_1$-$C_{22}$alkyl.

Preferred as component B) is magnesium hydroxide, natural $Mg(OH)_2$, like Brucite, and synthetic $Mg(OH)_2$.

The magnesium hydroxide can for example be surface treated with
i) fatty acids with 8 to 30 carbon atoms
ii) alkylsilane with at least one alkyl group having at least 3 C-atoms
iii) amino silanes such as 3-aminopropyltrimethoxysilane or 3-aminopropyltriethoxysilane
iv) organic titanates
v) organic Zirconates As to such surface treatments see, for example, WO-A-02/081574.

Preferred are Components B) having a purity of at least 90%, more preferably at least 95% and especially at least 98% by weight.

Likewise, preferred are Components B) having a mean particle size of 0.2 to 10 micrometres, and more preferably of 0.5 to 5 micrometres.

The weight ratio of component A) to component B) is preferably 1:25 to 25:1, more preferably 1:10 to 10:1. A weight ratio of 1:5 to 5:1 is highly preferred.

It is preferred that the Component B) has a B.E.T specific surface area of 2 to 20 $m^2/g$, more preferably 2 to 15 $m^2/g$.

The present articles may additionally comprise a component C) which is a phenolic antioxidant, in particular 1,3,5-tris(3,5-di-tert-butyl-4-hydroxybenzyl)-2,4,6-trimethylbenzene, ethylene bis[3,3-bis(3-tert-butyl-4-hydroxyphenyl)butyrate] or 1,3,5-tris(3,5-di-tert-butyl-4-hydroxybenzyl)-isocyanurate. 1,3,5-tris(3,5-di-tert-butyl-4-hydroxybenzyl)-2,4,6-trimethylbenzene is preferred.

The weight ratio of component A) to component C) is preferably 1:10 to 10:1, in particular 1:5 to 5:1.

The present articles may further comprise a component D) which is at least one compound selected from the group consisting of phosphites, phosphonites, hydroxylamines, tocopherols and tocopherol acetates. A phosphite is for example tris(2,4-di-tert-butyl-phenyl) phosphite, [3,3',5,5'-tetra-tert. butyl-1,1'biphenyl-2,2'-diyl]-[3-(3-methyl-4-hydroxy-5-tert. butyl-phenyl)-propyl]-phosphite, [2,2'-ethylene-bis-(4,6-di-tert. butylphenyl)-1,1'-diyl]-[1,6-dimethyl-4-(5,7-di-tert. butyl)-3H-1-benzofuran-2-one)-phenyl]-phosphite, [2,2'-ethylene-bis-(4,6-di-tert. butyl-phenyl)-1,1'-diyl]-[1-methyl-6-tert. butyl-4-(5,7-di-tert. butyl)-3H-1-benzofuran-2-one)-phenyl]-phosphite or 6-[3-(3-tert-butyl-4-hydroxy-5-methylphenyl)propoxy]-2,4,8,10-tetra-tert-butyldibenzo[d,f][1,3,2]dioxaphosphepin. Tocopherols are for example α-tocopherol, β-tocopherol, γ-tocopherol, δ-tocopherol or mixtures thereof. Hydroxylamines are for example dioctadecylhydroxylamine or N,N-dialkylhydroxylamine derived from hydrogenated tallow amine.

More preferably Component D) is tris(2,4-di-tert-butylphenyl) phosphite, [3,3',5,5'-tetra-tert. butyl-1,1'biphenyl-2,2'-diyl]-[3-(3-methyl-4-hydroxy-5-tert.butyl-phenyl)-propyl]-phosphite, [2,2'-ethylene-bis-(4,6-di-tert. butyl-phenyl)-1,1'-diyl]-[1,6-dimethyl-4-(5,7-di-tert. butyl)-3H-1-benzofuran-2-one)-phenyl]-phosphite, [2,2'-ethylene-bis-(4,6-di-tert. butyl-phenyl)-1,1'-diyl]-[1-methyl-6-tert. butyl-4-(5,7-di-tert. butyl)-3H-1-benzofuran-2-one)-phenyl]-phosphite, 6-[3-(3-tert-butyl-4-hydroxy-5-methylphenyl)propoxy]-2,4,8,10-tetra-tert-butyldibenzo[d,f][1,3,2]dioxaphosphepin, α-tocopherol, β-tocopherol, γ-tocopherol, δ-tocopherol, dioctadecylhydroxylamine or N,N-dialkylhydroxylamine derived from hydrogenated tallow amine. Highly preferred are α-tocopherol, β-tocopherol, γ-tocopherol, δ-tocopherol, dioctadecylhydroxylamine, N,N-dialkylhydroxylamine derived from hydrogenated tallow amine and especially tris(2,4-di-tert-butylphenyl)phosphite.

The weight ratio of component A) to component D) is preferably 1:10 to 10:1, in particular 1:5 to 5:1.

Of interest are articles which comprise components A), B), C) and D). The compounds of components A), B), C) and D) are known and are in essential commercially available.

Component A) is preferably present in the present articles in an amount of 0.01% to 2%, especially 0.05% to 2%, and more preferably 0.05% to 1%, by weight relative to the weight of the polyethylene or polypropylene.

Component B) is preferably present in the present articles in an amount of 0.05% to 5%, and more preferably 0.05% to 2%, by weight relative to the weight of the polyethylene or polypropylene. Furthermore, amounts of 0.01% to 2%, especially 0.01% to 1%, are of interest.

Component C) is preferably present in the present articles in an amount of 0.01% to 5%, especially 0.05% to 5%, and more preferably 0.05% to 2%, by weight relative to the weight of the polyethylene or polypropylene.

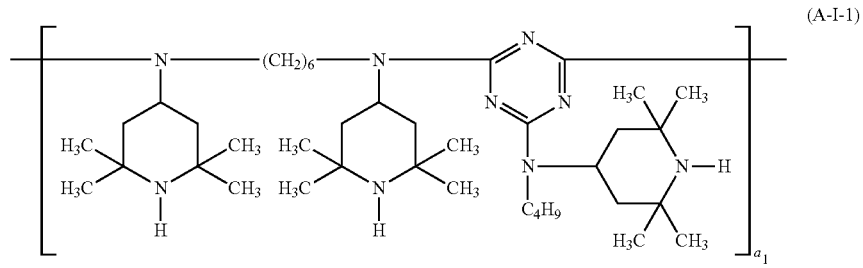

Component D) is preferably present in the present articles in an amount of 0.001% to 5%, especially 0.001% to 2%, and more preferably 0.02% to 1%, by weight relative to the weight of the polyethylene or polypropylene.

According to a preferred embodiment the present articles may additionally comprise a pigment, preferably a blue pigment.

The polyethylene is preferably selected from HD-PE, MD-PE, LD-PE, LLD-PE, metallocene PE, PE-X, mixture of PE, recycled PE, bi-modal PE, PE-RT, PE 32, PE 40, PE 63, PE 80, PE 100, PE 112, PE 125, PE 100 RC, PE 100 RT and PE 100 RD, in particular from high density polyethylene (HD-PE), medium density polyethylene (MD-PE), low density polyethylene (LD-PE), linear low density polyethylene (LLD-PE), metallocene polyethylene, crosslinked polyethylene (PE-X), recycled polyethylene, bi-modal polyethylene and mixtures of polyethylenes.

Also into consideration come ethylene/propylene copolymers and mixtures of polyethylene with other synthetic polymers, like polypropylene.

In corresponding mixtures, the amount by weight of polyethylene is preferably 20 to 99%, more preferably 50 to 99%, especially 75 to 99%. Highly preferred is an amount by weight of polyethylene of 85 to 99%.

In case of copolymers the molar amount of ethylene is preferably 20 to 99%, more preferably 50 to 99%, especially 75 to 99%, based on the total molar amount of ethylene and propylene. Highly preferred is a molar amount of ethylene of 85 to 99%.

The polypropylene is preferably a polypropylene homopolymer or ethylene/propylene copolymer as given above.

For example, the polypropylene may be categorized as atactic polypropylene (PP-at), syndiotactic polypropylene (PP-st) or isotactic polypropylene (PP-it). The density of polypropylene is preferably between 0.85 and 0.95 g/cm$^3$, especially between 0.895 and 0.92 g/cm$^3$.

Particular preferred are polyethylene, ethylene/propylene copolymers and mixtures of polyethylene with other synthetic polymers, like polypropylene. Highly preferred are polyethylene and ethylene/propylene copolymers, especially polyethylene.

According to a further embodiment polypropylene, ethylene/propylene copolymers and mixtures of polypropylene with other synthetic polymers, like polyethylene, are preferred. Highly preferred are polypropylene and ethylene/propylene copolymers, especially polypropylene.

The used polyethylene or polypropylene can be virgin or recycled material or blends thereof.

Particularly preferred articles comprise
as component (A) the compound of formula (A-I-1)

with $a_1$ being 2 to 10,
as component (C) 1,3,5-tris(3,5-di-tert-butyl-4-hydroxybenzyl)-2,4,6-trimethylbenzene, and
a component (D) as defined hereinbefore, especially tris[2, 4-di-tert-butyl-phenyl]phosphite.

The present articles may further comprise one or more conventional additives such as:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methylpentadec-1'-yl)phenol, 2,4-dimethyl-6-(t-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl) phenol], 2,2'-methylenebis(4-methyl-6-cyclohexylphenol), 2,2'-methylenebis(6-nonyl-4- methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methyl-phenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O—, N- and S-benzyl compounds, for example 3,5,3',5'-tetra-tert-butyl-4,4'-dihydroxydibenzyl ether, octadecyl-4-hydroxy-3,5-di methylbenzyl mercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-di methylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl) malonate, bis[4-(1,1,3,3-tetramethylbutyl)phenyl]-2,2-bis(3,5-di-tertbutyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-ditert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of τ3-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-ditert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N, N'-bis[2-(3-[3,5-di-tert-butyl-4-hydroxyphenyl]propionyloxy)ethyl]oxamide (Naugard®XL-1, supplied by Uniroyal).

1.18. Aminic antioxidants, for example N,N'-di-isopropyl-p-phenylenediamine, N,N'-disec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N, N'-dicyclohexyl-p-phenylenediamine, N, N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-secbutyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tertoctylphenothiazines, a mixture of mono- and dialkylated tert-octyl-phenothiazines, N-allylphenothiazine, N,N, N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl) phenyl)-5-chloro-benzotriazole, 2-(3'-tert-butyl-5-[2-(2-ethylhexyloxy)-carbonylethyl]-2'-hydroxyphenyl)-5-chloro-benzotriazole, 2-(3'-tertbutyl-2'-hydroxy-5'-(2-methoxycarbonylethyl)phenyl)-5-chloro-benzotriazole, 2-(3'-tertbutyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-2 hydroxy-5'-2H-benzotriazol-2-ylphenyl, 2-[2'-hydroxy-3'-(α,α-di methylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-ditert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxy-cinnamate, N-(β-carbomethoxy-β-cyanovinyl)-2-methylindoline, neopentyl tetra(α-cyano-β,β-diphenylacrylate).

2.5. Sterically hindered amines, for example 1,6-Hexanediamine N, N'-bis(1-propyloxy-2,2,6,6-tetramethyl-4-piperidinyl)-N, N'-bis-2-[4,5-bis-(N-n-butyl-N'-1-propyloxy-2,2,6,6-tetramethyl-4-piperidinyl)-1,3,5-triazine], 1,6-Hexanediamine N, N'-bis(2,2,6,6-tetramethyl-4-piperidinyl)-N, N'-bis-2-[4,5-bis-(N-n-butyl-N'-2,2,6,6-tetramethyl-4-piperidinyl)-1,3,5-triazine], carbonic acid bis (1-undecyloxy-2,2,6,6-tetramethyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tertoctylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N, N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis

[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine, loyl)hydrazine, N,N'-bis(3,5-di-tert-butyl-4-hydroxyphenyl-propionyl)hydrazine, 3-salicyloylamino-1,2,4-triazole, bis (benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

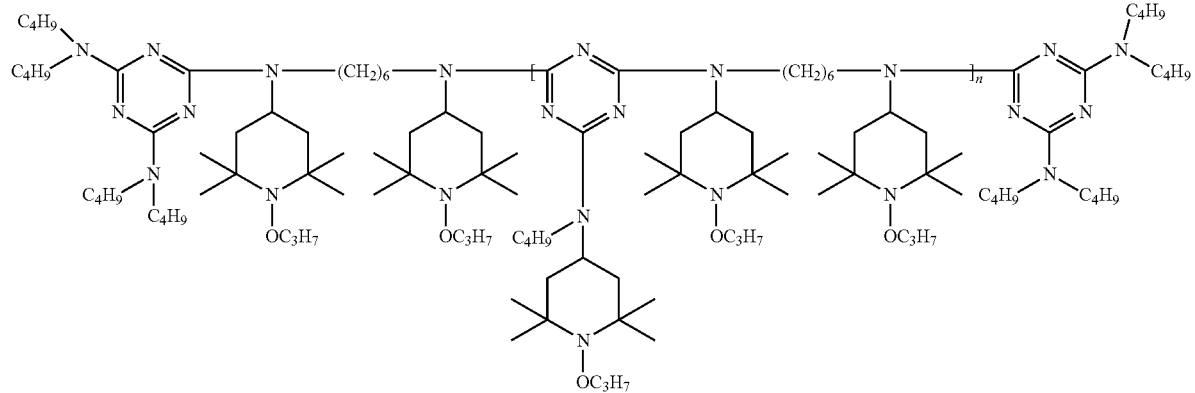

2.6 Benzoxazinone derivatives such as e.g. 2,2'-(1,4-phenylene)bis[4H-3,1-benzoxazin-4-one](CAS No. 018600-59-4).

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy) phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine, 2-(4,6-bis-biphenyl-4-yl-1,3,5-triazin-2-yl)-5-(2-ethyl-(n)hexyloxy)phenol.

3. Metal deactivators, for example N,N'-diphenyloxamide, N-salicylal-N'-salicyloyl hydrazine, N,N'-bis(salicy- 3a. Formamidines, for example Ethoxycarbonylphenyl)-N'-ethyl-N'-phenyl formamidine.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butyl-phenyl) phosphite, diisodecyl pentaerythritol diphosphite, bis(2,4-di-tertbutylphenyl)pentaerythritol diphosphite, bis(2,4-di-cumylphenyl)pentaerythritol diphosphite, bis(2,6-di-tert-butyl-4-methyl phenyl)pentaerythritol diphosphite, diisodecyloxy-pentaerythritol diphosphite, bis (2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, [3,3',5,5'-tetra-tert. butyl-1,1'biphenyl-2,2'-diyl]-[3-(3-methyl-4-hydroxy-5-tert.butyl-phenyl)propyl]-phosphite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tertbutyl-6-methylphenyl)ethyl phosphite, tris-[4-tert. butyl-2-(5-tert. butyl-3H-1-benzofuran-2-one)-phenyl]-phosphite, tris-[4-(1,1'3,3'-tetramethyl-butane)-2-(5-(1,1'3,3'-tetramethyl-butane-3H-1-benzofuran-2-one)-phenyl]-phosphite, tris-[2,6-dimethyl-(5,7-di-tert. butyl)-3H-1-benzofuran-2-one)-phenyl]-phosphite, bis-[2,6-dimethyl-(5,7-di-tert. butyl)-3H-1-benzofuran-2-one)-phenyl]-phenyl-phosphite, bis-[2,6-dimethyl-(5,7-di-tert. butyl)-3H-1-benzofuran-2-one)-phenyl]-[2,4-di-tert. butyl-phenyl]-phosphite, [3,3',5,5'-tetra-tert. butyl-1,1'biphenyl-2,2'-diyl]4-tert. butyl-(5-tert. butyl)-3H-1-benzofuran-2-one)-phenyl]-phosphite, [3,3',5,5'-tetra-tert. butyl-1,1'biphenyl-2,2'-diyl]-[2,6-dimethyl(5,7-di-tert. butyl)-3H-1-benzofuran-2-one)-phenyl]-phosphite, [2,2'-methylene-bis-(4,6-di-tert. butyl-phenyl)-1,1'-diyl]-[1,6-dimethyl-4-(5,7-di-tert. butyl)-3H-1-benzofuran-2-one)-phenyl]-phosphite, [2,2'-ethylene-bis-(4,6-di-tert. butyl-phenyl)-1,1'-diyl]-[1,6-dimethyl-4-(5,7-di-tert. butyl)-3H-1-benzofuran-2-one)-phenyl]-phosphite, [2,2'-ethylene-bis-(4,6-di-tert. butyl-phenyl)-1,1'-diyl]-[1-methyl-6-tert. butyl-4-(5,7-di-tert. butyl)-3H-1-benzofuran-2-one)-phenyl]-phosphite, bis-(2,6-dimethyl-(5,7-di-tert. butyl)-3H-1-benzofuran-2-one)-phenol) pentaerythritol diphosphite, bis-(1-methyl-6-tert.

butyl-(5,7-di-tert. butyl)-3H-1-benzofuran-2-one)-phenol) pentaerythritol diphosphite, bis-(4-tert. butyl-(5-tert. butyl)-3H-1-benzofuran-2-one)-phenol) pentaerythritol diphosphite, bis-(4-(1,1'3,3'-tetramethyl-butane)-(5-(1,1'3,3'-tetramethyl-butane))-3H-1-benzofuran-2-one)-phenol) pentaerythritol diphosphite, 6-fluoro-2,4,8,10-tetra-tert-butyl-12-methyldibenz[d,g]-1,3,2-dioxaphosphocin, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl)phosphite (Irgafos® 168, BASF SE), tris(nonylphenyl) phosphite, phosphorus acid mixed 2,4-bis(1,1-dimethylpropyl)phenyl and 4-(1,1-dimethylpropyl)phenyl triesters (CAS Reg. No. 939402-02-5), phosphorous acid triphenyl ester polymer with alpha-hydro-omega-hydroxypoly[oxy(methyl-1,2-ethanediyl) C10-16 alkyl esters (CAS Reg. No. 1227937-46-3).

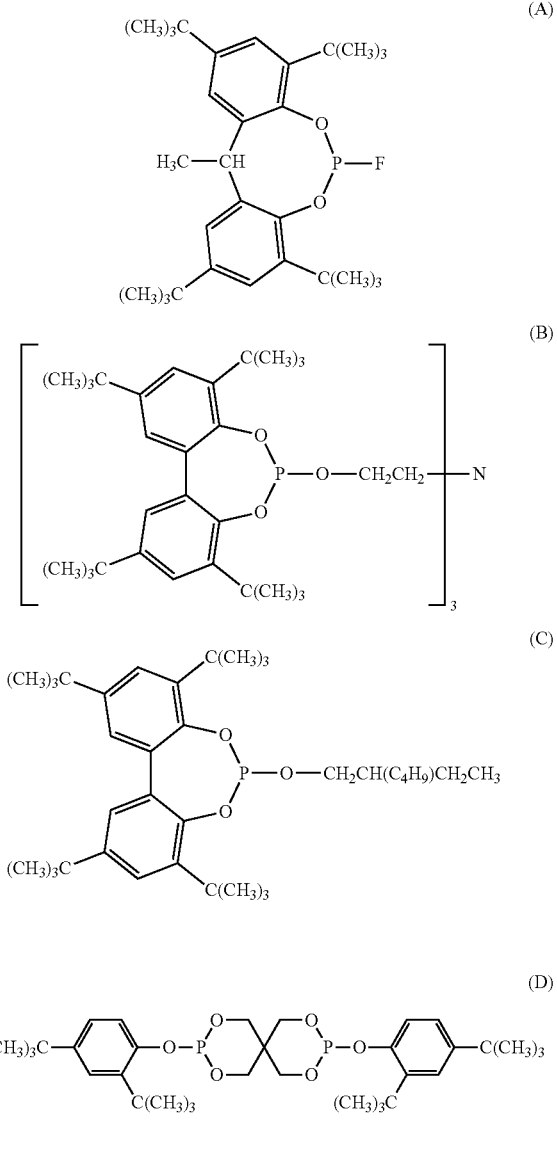

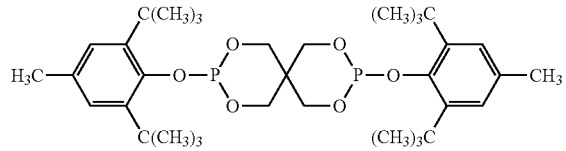

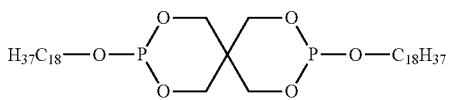

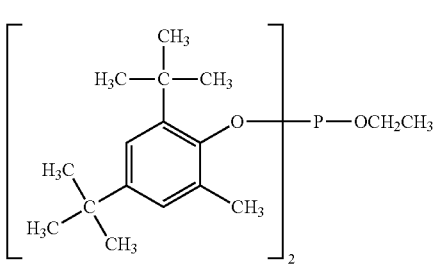

[2,2'-ethylene-bis-(4,6-di-tert. butyl-phenyl)-1,1'-diyl]-[1,6-dimethyl-4-(5,7-di-tert. butyl)-3H-1-benzofuran-2-one)-phenyl]-phosphite, [2,2'-ethylene-bis-(4,6-di-tert. butylphenyl)-1,1'-diyl]-[1-methyl-6-tert. butyl-4-(5,7-di-tert. butyl)-3H-1-benzofuran-2-one)phenyl]-phosphite, [3,3',5,5'-tetra-tert. butyl-1,1'biphenyl-2,2'-diyl]-[3-(3-methyl-4-hydroxy-5-tert.butyl-phenyl)-propyl]-phosphite.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N, N-dihexadecylhydroxylamine, N,N-dioctadecylhydroxylamine, N-hexadecyl-N-octadecylhydroxylamine, N-heptadecyl-N-octadecylhydrox-ylamine, N,N-dialkylhydroxylamine derived from hydrogenated tallow amine.

6. Amine oxides, for example N,N-dibenzylhydroxylamine oxide, N,N-diethylhydroxylamine oxide, N,N-dioctylhydroxylamine oxide, N,N-dilaurylhydroxylamine oxide, N,N-ditetradecylhydroxylamine oxide, N,N-dihexadecylhydroxylamine oxide, N,N-dioctadecylhydroxylamine oxide, N-hexadecyl-N-octadecylhydrox-ylamine oxide, N-heptadecyl-N-octadecylhydroxylamine oxide, N,N-dialkylhydroxylamine oxide derived from hydrogenated tallow amine.

7. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

8. Thiosynergists, for example dilauryl thiodipropionate, dimistryl thiodipropionate, distearyl thiodipropionate, pentaerythritol tetrakis[3-(dodecylthio)propionate] or distearyl disulfide.

9. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate, zeolithes, hydrotalcites, hydrocalumites.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol. Beta-nucleating agents are also of interest.

12. Fillers and reinforcing agents, for example calcium carbonate, silicates, glass fibres, carbon fibers, glass beads, asbestos, talcum (preferably with a particle size of 0.01 to 20 μm), kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tertbutylbenzofuran-2-one, 3-(3,5-dimethyl-4-pivaloyloxyphenyl)-5,7-di-tertbutylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The conventional additive may be present in the articles according to the present invention in an amount of e.g. 0.001 to 10%, relative to the weight of the polyethylene or polypropylene.

According to a preferred embodiment the present articles comprise in addition to the magnesium hydroxide hydrotalcites.

Hydrotalcites are, especially, layered double hydroxides that contain positively charged hydroxide layers and charge balancing anions located in the interlayer region.

Hydrotalcites are in particular at least one magnesium aluminum hydroxide carbonate hydrate which is for example commercially available as Hycite®713, ®DHT-4A, ®DHT-4V, ®DHT-4A-2, ®DHT-4C or Sorbacid®911, or zinc aluminum hydroxide carbonate hydrate which is for example commercially available as ®ZHT-4V or Sorbacid®944, or mixtures thereof.

Of particular interest is a magnesium aluminum hydroxide carbonate hydrate which is for example commercially available as Hycite®713 or ®DHT-4A.

As given hereinbefore, Component B) of the present invention does not constitute such hydrotalcites, but such hydrotalcites can be present in addition to Component B).

Components A) and B) as well as optional further additives of the invention may readily be incorporated into the polyethylene or polypropylene by conventional techniques, at any convenient stage prior to the manufacture of the articles therefrom.

Components A) and B) may be added together or successively, if desired at different stages of processing the polyethylene or polypropylene.

Components A) and B) as well as optional further additives can judiciously be incorporated by one of the following methods:
- as emulsion or dispersion
- as a dry mixture during the blending
- by direct introduction into the processing apparatus (e.g. extruders, internal mixers)
- as melt.

Incorporation of Components A) and B) as well as optional further additives is performed best in a thermal compounding step. Thorough blending of Components A) and B) as well as optional further additives is followed by an extrusion of the physical blend at elevated temperature. Typically, an extruder with suitable screw configuration is used for this step.

Components A) and B) as well as optional further additives of the invention can also be added to the polyethylene or polypropylene in the form of a masterbatch (concentrate), which contains Components A) and B) as well as optional further additives of the invention incorporated in a further polymer of the masterbatch, like in polyethylene or polypropylene. The concentration for the sum of additives in such masterbatch is, for example, from 1% to 90%, preferably 1% to 40%, and in particular 2.5% to 25% by weight of the masterbatch. The polymer, like polyethylene or polypropylene, may be present in such masterbatch in a concentration of 10% to 99%, preferably 60% to 99%, and in particular 75% to 97.5%. Said polymer of the masterbatch must not be necessarily polyethylene or polypropylene. The masterbatch can for example be in the form of a powder, granules, dispersions or in the form of latices.

Pipes are for example those for domestic, municipal or industrial applications, non-pressure up to high-pressure pipe applications used for drinkable or non-drinkable water, for general purpose water or waste water. Furthermore, pipes are for example those which are in contact with chlorinated (common chlorinated water disinfectants such as chlorine (hypo-chlorite), chlorine dioxide and chloramines) or non-chlorinated water, in all cases including cold or hot water. Preferred are pipes which are in contact with chlorinated or non-chlorinated water, especially chlorinated water.

Cables are for example power cables, communication cables and conduits. Herein, as a rule, the cable insulation of medium and high voltage power cables is stabilized. A range for medium voltage is 1 kV to 40 kV. "High voltage" relates to a valve voltage exceeding about 40 kV, especially 40-110 kV.

Geomembranes are, as a rule, used to provide a barrier between ground soil and other substances. For examples, such membranes can be used to prevent chemicals from seeping into or out of soil or water, or for covering water that has been known to emit odors, such as industrial wastewater, for odor control.

There are various types of geomembranes including linear low-density polyethylene (LLDPE), medium-density polyethylene (MDPE) and high-density polyethylene (HDPE).

There are three fundamental liner designs—single, double, and composite liners. Single geomembrane liners are typically used in non-critical applications. The double lining system is similar to double hulls on ships—all ship hulls leak but the ship does not sink provided the leaking water is pumped out. For the most critical applications composite lining systems consisting of a geomembrane and a clay or GCL liner are used. When there is a hole in the geomembrane the leak only acts on a small area of clay (GCL), provided there is intimate contact between geomembrane and clay.

As articles pipes and geomembranes, especially pipes, are preferred.

Furthermore, preference is given to pipes and geomembranes which are in contact with oxidizing media.

By use of Components A) and B) the detrimental effect of such oxidizing media can be reduced to a greater extent.

In case of pipes corresponding oxidizing media are, for example, oxidizing organics, oxidizing acids, or especially chlorinated water (like common chlorinated water disinfectants such as chlorine (hypo-chlorite), chlorine dioxide and chloramines). Preferred pipes are those which are in contact with chlorinated water.

In case of geomembranes oxidizing media are, for example, oxidizing organics or oxidizing acids, like sulphuric acid.

The articles may be manufactured by any process available to those of ordinary skill in the art including, but not limited to, extrusion, extrusion blowing, film casting, film blowing, calendering, injection molding, blow molding, compression molding, thermoforming, spinning, blow extrusion or rotational casting.

For the production of the desired articles out of the polymer compositions, any appropriate equipment can be used, depending on the final form of the article, for example a blow extruder in the case of films, an extrusion machine in the case of sheets or an injection molding machine.

The embodiments of the present invention can for example serve for the stabilization of corresponding articles made of polyethylene or polypropylene being susceptible to oxidative, thermal or light-induced degradation, especially oxidative induced degradation.

The examples below illustrate the invention in greater detail. All percentages and parts are by weight, unless stated otherwise.

Additives used in the following examples:
Imanox®1330:
(CAS number: 1709-70-2)
1,3,5-Tris(3,5-di-tert-butyl-4-hydroxybenzyl)-2,4,6-trimethylbenzene
Irqafos®168:
(CAS number: 31570-04-4)
Tris[2,4-di-tert-butylphenyl]phosphite
Chimassorb®2020:
(CAS number: 192268-64-7)

wherein $E_1$ is

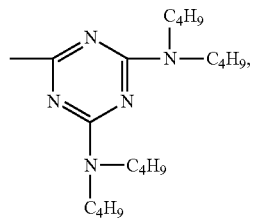

$E_2$ is

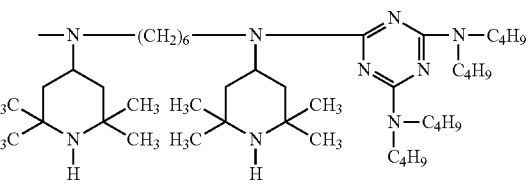

and $a_1$ is a number from 2 to 10.
Hycite®713:
(CAS number: 012304-65-3 or 11097-59-9)
Hydrotalcite (Magnesium aluminum hydroxide carbonate hydrate)
Kisuma 10A
(CAS number: 1309-42-8)
Magnesium hydroxide
Magnifin H-5 IV (is aminosilane surface treated)
(CAS number: 1309-42-8)
Magnesium hydroxide

EXAMPLES 1 TO 13

Preparation of the test specimens: A mixture of a non-stabilised high density polyethylene (HD-PE; Hostalen®CRP-100; natural classified under PE 100 of LyondellBasell; Melt Flow Rate: 190° C./5.0 Kg: 0.23 g/10 min (ISO 1133); Density: 0.95 g/cm3 (ISO 1183)) and the additives listed in Table 1 is mixed with a Mixaco Lab CM12 high speed mixer device.

The obtained full formulation is then compounded on a Collin 25×42D extruder at 240° C. and then injection molded on an Engel HL65 injection molding machine at 230° C.

For the injection molded plaques of 40 mm×60 mm×2 mm OIT Values (Oxidative Induction Time, DIN EN ISO 11357-6) are measured using a DSC Q2000 of TA Instrument (Waters) at 200° C. under $O_2$. The results are listed in the following Table 1.

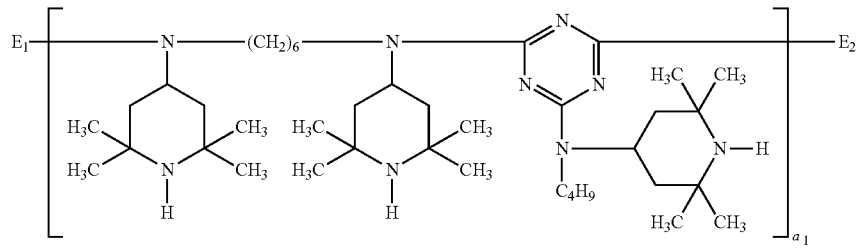

TABLE 1

| | Additive Formulation | OIT Results/Minutes |
|---|---|---|
| Comparative Example 1 | 0.3% of Irganox ®1330 + 0.1% of Irgafos ®168 | 50 |
| Comparative Example 2 | 0.3% of Irganox ®1330 + 0.1% of Irgafos ®168 plus 0.2% of Hycite ®713 | 50 |
| Comparative Example 3 | 0.3% of Irganox ®1330 + 0.1% of Irgafos ®168 plus 0.2% of Kisuma 10A | 50 |
| Comparative Example 4 | 0.3% of Irganox ®1330 + 0.1% of Irgafos ®168 plus 0.2% of Chimassorb ®2020 | 130 |
| Example 5 | 0.3% of Irganox ®1330 + 0.1% of Irgafos ®168 plus 0.2% of Chimassorb ®2020 + 0.2% of Kisuma 10A | 170 |
| Example 6 | 0.3% of Irganox ®1330 + 0.1% of Irgafos ®168 plus 0.2% of Chimassorb ®2020 + 0.4% of Kisuma 10A | 450 |
| Example 7 | 0.3% of Irganox ®1330 + 0.1% of Irgafos ®168 plus 0.2% of Chimassorb ®2020 + 0.1% of Kisuma 10A + 0.1% of Hycite ®713 | 280 |
| Example 8 | 0.3% of Irganox ®1330 + 0.1% of Irgafos ®168 plus 0.2% of Chimassorb ®2020 + 0.2% of Kisuma 10A + 0.2% of Hycite ®713 | 600 |
| Example 9 | 0.3% of Irganox ®1330 + 0.1% of Irgafos ®168 plus 0.2% of Chimassorb ®2020 + 0.3% of Kisuma 10A + 0.3% of Hycite ®713 | 620 |
| Example 10 | 0.3% of Irganox ®1330 + 0.1% of Irgafos ®168 plus 0.2% of Chimassorb ®2020 + 0.2% of Magnifin H-5 IV | 190 |
| Example 11 | 0.3% of Irganox ®1330 + 0.1% of Irgafos ®168 plus 0.2% of Chimassorb ®2020 + 0.4% of Magnifin H-5 IV | 395 |
| Example 12 | 0.3% of Irganox ®1330 + 0.1% of Irgafos ®168 plus 0.2% of Chimassorb ®2020 + 0.6% of Magnifin H-5 IV | 529 |
| Example 13 | 0.3% of Irganox ®1330 + 0.1% of Irgafos ®168 plus 0.2% of Chimassorb ®2020 + 0.2% of Magnifin H-5 IV + 0.2% of Hycite ®713 | 360 |

High OIT-values are desired.
The materials as obtained according to Examples 1 to 13 after compounding, are used for the preparation of pipes according to conventional methods.

Examples 14 to 20

Preparation of the test specimens: A mixture of a non-stabilised polypropylene (Moplen HF501N of LyondellBasell) and the additives listed in Table 2 are mixed with a laboratory mixer MTI M 20.

The obtained full formulation is then compounded on a Collin ZK25Ex42D extruder at 230° C. and then injection molded on an Arburg Allrounder Selecta 320 S 500-150 injection molding machine at 230° C.

For the injection molded plaques of 44 mm×68 mm×2 mm OIT Values (Oxidative Induction Time, DIN EN ISO 11357-6) are measured using a DSC Q2000 of TA Instrument (Waters) at 180° C. under $O_2$. The results are listed in the following Table 2.

TABLE 2

| | Additive Formulation | OIT Results/Minutes |
|---|---|---|
| Comparative Example 14 | 0.3% of Irganox ®1330 + 0.1% of Irgafos ®168 | 149 |
| Example 15 | 0.3% of Irganox ®1330 + 0.1% of Irgafos ®168 plus 0.2% of Chimassorb ®2020 + 0.2% of Kisuma 10A | 282 |
| Example 16 | 0.3% of Irganox ®1330 + 0.1% of Irgafos ®168 plus 0.2% of Chimassorb ®2020 + 0.4% of Kisuma 10A | 321 |
| Example 17 | 0.3% of Irganox ®1330 + 0.1% of Irgafos ®168 plus 0.2% of Chimassorb ®2020 + 0.1% of Kisuma 10A + 0.1% of Hycite ®713 | 304 |
| Example 18 | 0.3% of Irganox ®1330 + 0.1% of Irgafos ®168 plus 0.2% of Chimassorb ®2020 + 0.2% of Kisuma 10A + 0.2% of Hycite ®713 | 395 |
| Example 19 | 0.3% of Irganox ®1330 + 0.1% of Irgafos ®168 plus 0.2% of Chimassorb ®2020 + 0.2% of Magnifin H-5 IV | 346 |
| Example 20 | 0.3% of Irganox ®1330 + 0.1% of Irgafos ®168 plus 0.2% of Chimassorb ®2020 + 0.4% of Magnifin H-5 IV | 390 |

High OIT-values are desired.
The materials as obtained according to Examples 14 to 20 after compounding, are used for the preparation of pipes according to conventional methods.

The invention claimed is:
1. An article in the form of a pipe, cable or geomembrane comprising polyethylene and components A), B), C), D), and E),
wherein:
component A) is a compound of formula (A-I-1):

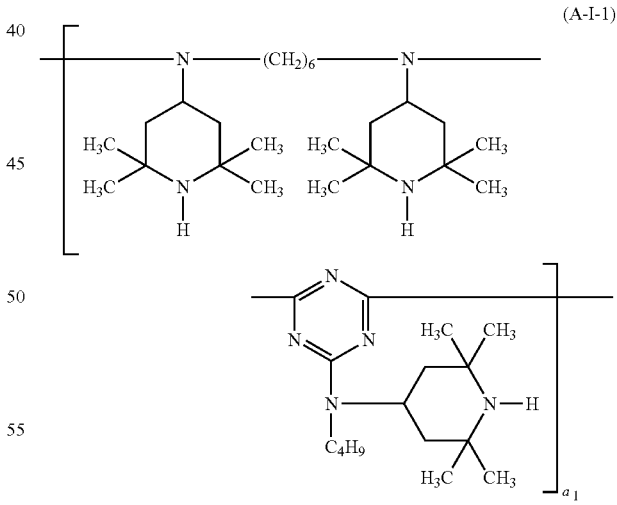

with $a_1$ being 2 to 10,
component B) is magnesium hydroxide which is present in an amount of 0.05% to 0.3% by weight relative to the weight of the polyethylene, wherein the magnesium hydroxide is natural or synthetic, and wherein the magnesium hydroxide is not surface treated,
component C) is 1,3,5-tris(3,5-di-tert-butyl-4-hydroxy-benzyl)-2,4,6-trimethylbenzene, component D) is tris[2,4-di-tert-butylphenyl]phosphite,
component E) is a hydrotalcite, and
a weight ratio of component A) to component B) is 0.7:1 to 2:1,
with the proviso that component B) is not a hydrotalcite.

2. The article according to claim 1, wherein component B) has a mean particle size of 0.2 to 10 micrometres.

3. The article according to claim 1, which is in the form of a pipe or geomembrane.

4. The article according to claim 3, which is in contact with oxidizing media.

5. The article according to claim 1, which is in the form of a pipe.

6. The article according to claim 5, which is in contact with chlorinated water.

7. The article according to claim 1 comprising polyethylene.

* * * * *